US012673532B2

(12) United States Patent
Dubois

(10) Patent No.: US 12,673,532 B2
(45) Date of Patent: Jul. 7, 2026

(54) DEVICE FOR CONTROLLING A FLAP

(71) Applicant: Valeo Systemes Thermiques, Le Mesnil Saint-Denis (FR)

(72) Inventor: Christian Dubois, Le Mesnil Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 760 days.

(21) Appl. No.: 17/635,581

(22) PCT Filed: Jul. 29, 2020

(86) PCT No.: PCT/FR2020/051402
§ 371 (c)(1),
(2) Date: Feb. 15, 2022

(87) PCT Pub. No.: WO2021/032917
PCT Pub. Date: Feb. 25, 2021

(65) Prior Publication Data
US 2022/0266654 A1 Aug. 25, 2022

(30) Foreign Application Priority Data
Aug. 21, 2019 (FR) ...................................... 1909312

(51) Int. Cl.
*B60H 1/00* (2006.01)
*F16H 19/04* (2006.01)
(52) U.S. Cl.
CPC ......... *B60H 1/00857* (2013.01); *F16H 19/04* (2013.01)

(58) Field of Classification Search
CPC ............................ B60H 1/00857; F16H 19/04
(Continued)

(56) References Cited

U.S. PATENT DOCUMENTS

| | | | | |
|---|---|---|---|---|
| 4,653,386 A | * | 3/1987 | Hayakawa | ............ F24F 13/075 454/316 |
| 5,924,332 A | * | 7/1999 | Ozeki | ................ B60H 1/00857 454/316 |

(Continued)

FOREIGN PATENT DOCUMENTS

| | | | | |
|---|---|---|---|---|
| DE | 417351 A1 | * | 3/1991 | |
| DE | 3821541 C2 | * | 5/1997 | ......... B60H 1/00857 |

(Continued)

OTHER PUBLICATIONS

Migchielsen Roger et al., "Door Closer" Jun. 27, 2006 CA-2305214-C see figs 4, 5; particularly p. 11, In 27—p. 13, In 28 (Year: 2006).*

(Continued)

*Primary Examiner* — Michael G Hoang
*Assistant Examiner* — Frances F. Hamilton
(74) *Attorney, Agent, or Firm* — Osha Bergman Watanabe & Burton LLP

(57) ABSTRACT

The invention relates to a device for controlling an element, such as a shutter, for a motor vehicle heating, ventilation and/or air conditioning system, comprising: —an arm (31) comprising an opening (3) so as to define a ring the inner circumference (4) of which at least partially comprises a rack (5) and an axial retaining means (14), —a toothed wheel (11) intended to be rigidly connected to an axis and shaped to cooperate with the axial retaining means (14) and the rack (5) so as to cause the element to move.

8 Claims, 5 Drawing Sheets

(58) Field of Classification Search
    USPC ...................................................... 454/69, 73
    See application file for complete search history.

(56)                    References Cited

U.S. PATENT DOCUMENTS

| | | | | | | |
|---|---|---|---|---|---|---|
| 6,129,627 | A | * | 10/2000 | Jankowski | ........... | B60H 1/3414 |
| | | | | | | 454/155 |
| 2009/0156343 | A1 | * | 6/2009 | Stevenson | ................ | G05G 1/10 |
| | | | | | | 474/167 |
| 2019/0375266 | A1 | * | 12/2019 | Belzons | .............. | B60H 1/0065 |

FOREIGN PATENT DOCUMENTS

| | | | | | | |
|---|---|---|---|---|---|---|
| DE | 10144122 | C1 | | 1/2003 | | |
| EP | 1710470 | A2 | | 10/2006 | | |
| EP | 2647878 | A2 | * | 10/2013 | ............. | E05B 53/00 |
| EP | 3456562 | A1 | * | 3/2019 | ......... | B60H 1/00857 |
| FR | 2664860 | A1 | | 1/1992 | | |
| FR | 2664860 | B1 | * | 12/1994 | | |
| FR | 2766760 | A1 | | 2/1999 | | |
| FR | 3019100 | A1 | * | 10/2015 | ........ | B60H 1/00685 |
| GB | 2328012 | A | * | 2/1999 | ........ | B60H 1/00685 |
| JP | 2025043601 | A | * | 4/2025 | | |
| WO | 2008047625 | A1 | | 4/2008 | | |

OTHER PUBLICATIONS

Office Action issued in corresponding Chinese Patent Application No. CN 202080057888.6 issued Dec. 1, 2023 (25 pages).
International Search Report and Written Opinion in corresponding International Application No. PCT/FR2020/051402, mailed Oct. 16, 2020 (10 pages).
Office Action Issued in Corresponding CN Application No. 202080057888.6, dated Aug. 3, 2024. (13 Pages with English Translation).

* cited by examiner

DEVICE FOR CONTROLLING A FLAP

The present disclosure relates to a device for controlling a flap for a motor vehicle heating, ventilating and/or air conditioning system.

It is known that such a motor vehicle heating, ventilating and/or air conditioning system comprises a multiplicity of flaps the movement of which must be controlled, whether they are air inlet flaps, mixing flaps or distribution flaps.

To this end, what are generally provided are transmission devices comprising a rack which is in the form of a bar provided with teeth and cooperates with a pinion, such that rotation of the pinion driven by the rack controls the pivoting of an associated flap. It is then necessary to provide an assembly, for example screw and washer, for axially retaining the pinion against the rack, which makes the process for manufacturing the motor vehicle heating, ventilating and/or air conditioning system more complex and increases its cost.

The present disclosure seeks to improve the situation.

To that end, what is proposed is a device for controlling an element, such as a flap, for a motor vehicle heating, ventilating and/or air conditioning system, comprising an arm, intended to be driven by an actuator, comprising an orifice so as to define a ring an internal, or inside, circumference of which at least partially has a rack and an axially retaining means, a toothed wheel which is intended to be integral with a shaft and is configured so as to cooperate with the axially retaining means and the rack in such a way as to move said element.

Therefore, by virtue of the present invention, the axial retention makes it possible to avoid resorting to any additional part, thereby simplifying the manufacturing process and reducing its cost.

According to another aspect, the axially retaining means and the rack are borne by opposite sides of said inside circumference.

According to another aspect, said inside circumference is provided with a radially guiding means.

According to another aspect, the orifice is an oblong hole.

According to another aspect, the axially retaining means is constituted by a first diameter of the oblong hole and the radially guiding means is constituted by a second diameter of the oblong hole, which is different from the first diameter.

According to another aspect, a first diameter of the toothed wheel is larger than the first diameter of the oblong hole.

According to another aspect, a second diameter of the toothed wheel is larger than the second diameter of the oblong hole.

According to another aspect, the axially retaining means and the radially guiding means are constituted by a diameter of the oblong hole.

According to another aspect, a diameter of the toothed wheel is larger than said diameter of the oblong hole.

What is also proposed is a motor vehicle heating, ventilating and/or air conditioning system, comprising at least one flap and a control device as described above for controlling the movement of said flap.

Further features, details and advantages will become apparent on reading the following detailed description, and on studying the appended drawings, in which.

Figure 1:
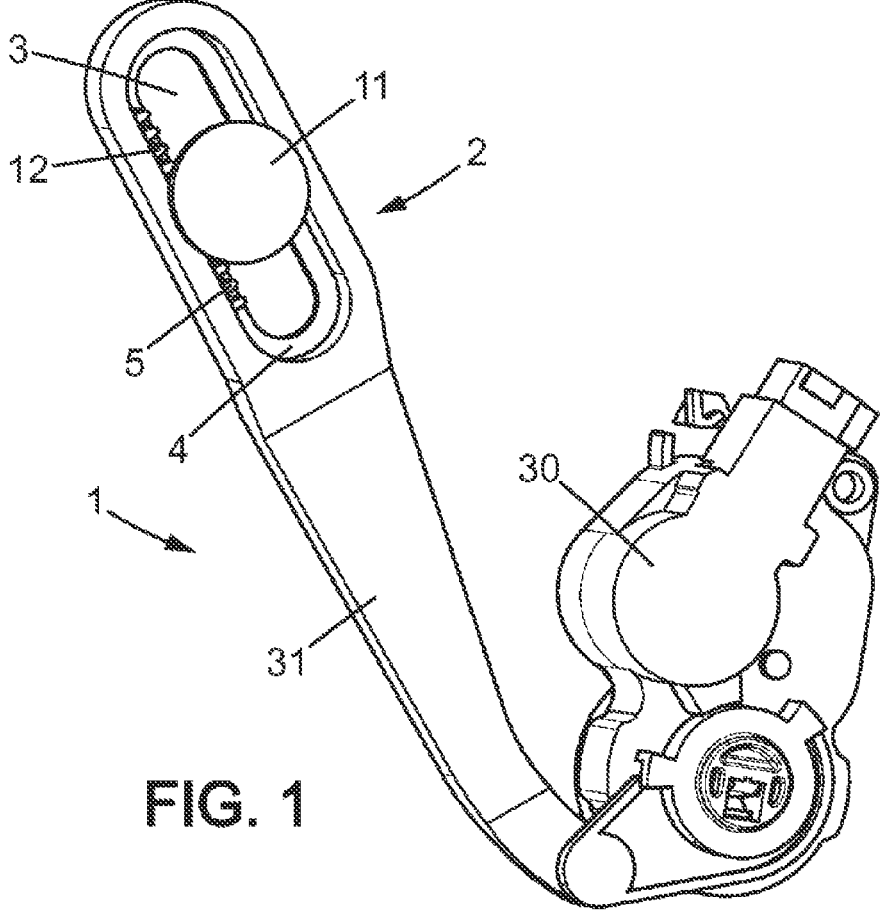
FIG. 1 shows a perspective view of a control device according to the present invention.

The drawings and the description below contain, for the most part, elements of a certain character. Therefore, they may not only serve for understanding the present disclosure better, but also contribute to its definition, where appropriate.

As is shown in the figures, the invention relates to a device for controlling an element, such as a flap, for a motor vehicle heating, ventilating and/or air conditioning system. The control device bears the reference 1 in the figures. It is shown here in its application of controlling the pivoting of a flap of the heating, ventilating and/or air conditioning system. This flap is in particular an air inlet flap, mixing flap or distribution flap.

The invention also relates to a movement transmission device 2 which may in particular be put into action by the control device 1.

First of all, the movement transmission device 2 will be described.

As can be seen in the figures, the transmission device 2 comprises an arm 31, or a connecting rod, comprising an orifice 3 provided at its circumference 4 with a rack 5. It is also possible to say that the arm 31 comprises an orifice 3 in its structure so as to define a ring the internal or inside circumference 4 of which at least partially has a rack 5 and an axially retaining means 14. In other words, the arm 31 and the orifice 3 define a ring, in this instance of oblong shape, with the rack 5 being arranged at least partially on the internal or inside circumference 4 of the ring. In other words, the end of the arm 31 and the orifice 3 define a toroid, or an annulus, of elongate shape with the rack being arranged on the internal circumference 4 of the toroid.

In the embodiment shown, the orifice 3 is an oblong through-hole. However, the invention is not limited to this configuration.

As is apparent from the figures, the oblong hole 3 has two opposite straight sides 7, 8 disposed between two rounded ends 9, 10. A space E delimited by the sides 7, 8 and the ends 9, 10 is configured so as to receive a toothed wheel 11, as will be set out below.

The rack 5 corresponds to a part 12 of said circumference 4 that is provided with a plurality of teeth 13 configured so as to cooperate with the toothed wheel 11. In other words, the rack 5 does not extend over the entirety of said circumference 4.

In the figures, the rack 5 is disposed on one of the sides 7 of the oblong hole 3.

The inside circumference 4 of the ring, in other words of the oblong hole 3, is also provided with a means 14 for axially retaining the toothed wheel 11, and also a means 15 for radially guiding the toothed wheel 11, both of which will be described in relation to FIG. 2.

As is shown in the figures, the toothed wheel 11 comprises a sector 16 that is provided with teeth 17 and also a sector without teeth, which is referred to as smooth sector 18. The teeth 17 are configured so as to cooperate with the teeth 13 of the rack 5, such that the teeth 17 engage or are engaged by the teeth 13.

The transmission device 2 will now be described with reference to FIG. 2.

As is apparent from this figure, the oblong hole 3 delimits a first diameter 20 and a second diameter 21.

The first diameter 20 corresponds to the distance between the opposite sides 7, 8 over a first section-height part 22. The second diameter 21 corresponds to the distance between the opposite sides 7, 8 over a second section-height part 23. In FIG. 2, the first diameter 20 is larger than the second diameter 21. In other words, the cross section of each side 7, 8 has an L-shaped overall shape.

The first diameter 20 forms the axially retaining means 14. The second diameter 21 forms the radially guiding means 15.

Figure 2:
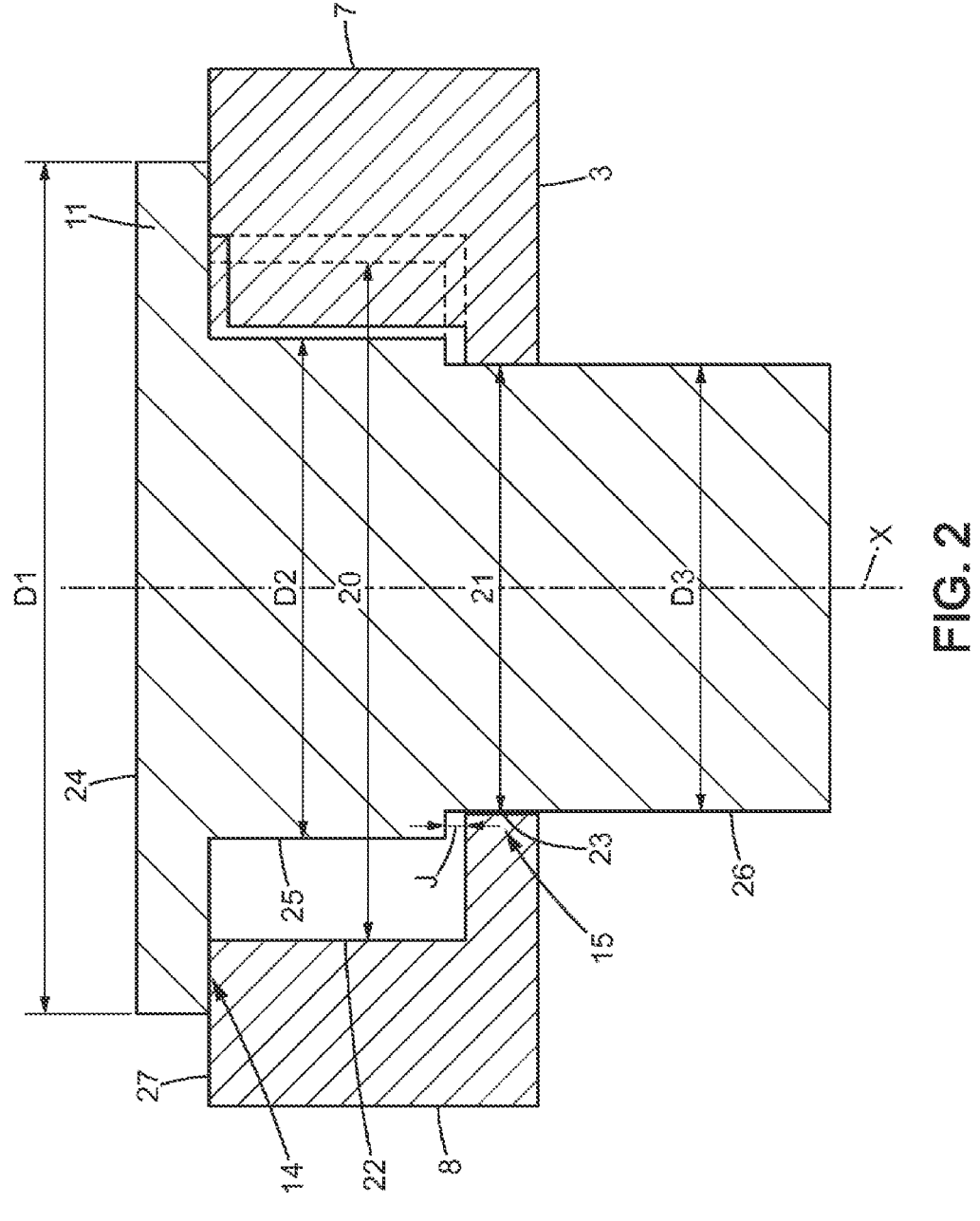
FIG. 2 shows a cross section of a detail of the control device of FIG. 1.

As is also shown in FIG. 2, the toothed wheel 11 has a symmetry of revolution about an axis X passing through the middle of the first and second diameters 20, 21.

The toothed wheel 11 comprises an upper portion 24 of diameter D1, an intermediate portion 25 of diameter D2 and a lower portion 26 of diameter D3, the intermediate portion 25 being disposed between the portions 24 and 26. It should be noted that the diameter D1 is larger than the diameter D2, which is itself larger than the diameter D3.

The upper portion 24 of the toothed wheel 11 rests on a top 27 of the first section-height part 22 of the side 8, the diameter D1 being larger than the first diameter 20, thereby axially retaining the toothed wheel 11.

The diameter D3 is approximately identical to the diameter 21, thereby radially guiding the toothed wheel 11.

It should be noted that there is a clearance J between the intermediate portion 25 and the part 23, this requiring that the axial-retention and radial-guidance functions are decoupled.

According to a variant that is not shown, there is no clearance J. In this case, owing to the offset between the portions 25 and 26, the section-height part 23 ensures the axial-retention and guidance functions, the diameter 21 being smaller than the diameter D2. In other words, according to this variant, the axially retaining means 14 and the radially guiding means 15 are constituted by the diameter 21.

With reference now to FIGS. 1 and 3 to 5, the control device 1 comprises the movement transmission device 2 already described.

The control device 1 comprises an actuator 30 and an arm that is driven by the actuator 30.

The arm 31 bears the oblong hole 3 provided with the axially retaining means 14 and guiding means 15 that were set out in relation to FIG. 2.

The toothed wheel 11 is accommodated in the oblong hole 3, as has already been described. The wheel 11 is integral with a shaft (not shown), which is itself directly or indirectly integral with a flap.

Figure 3:
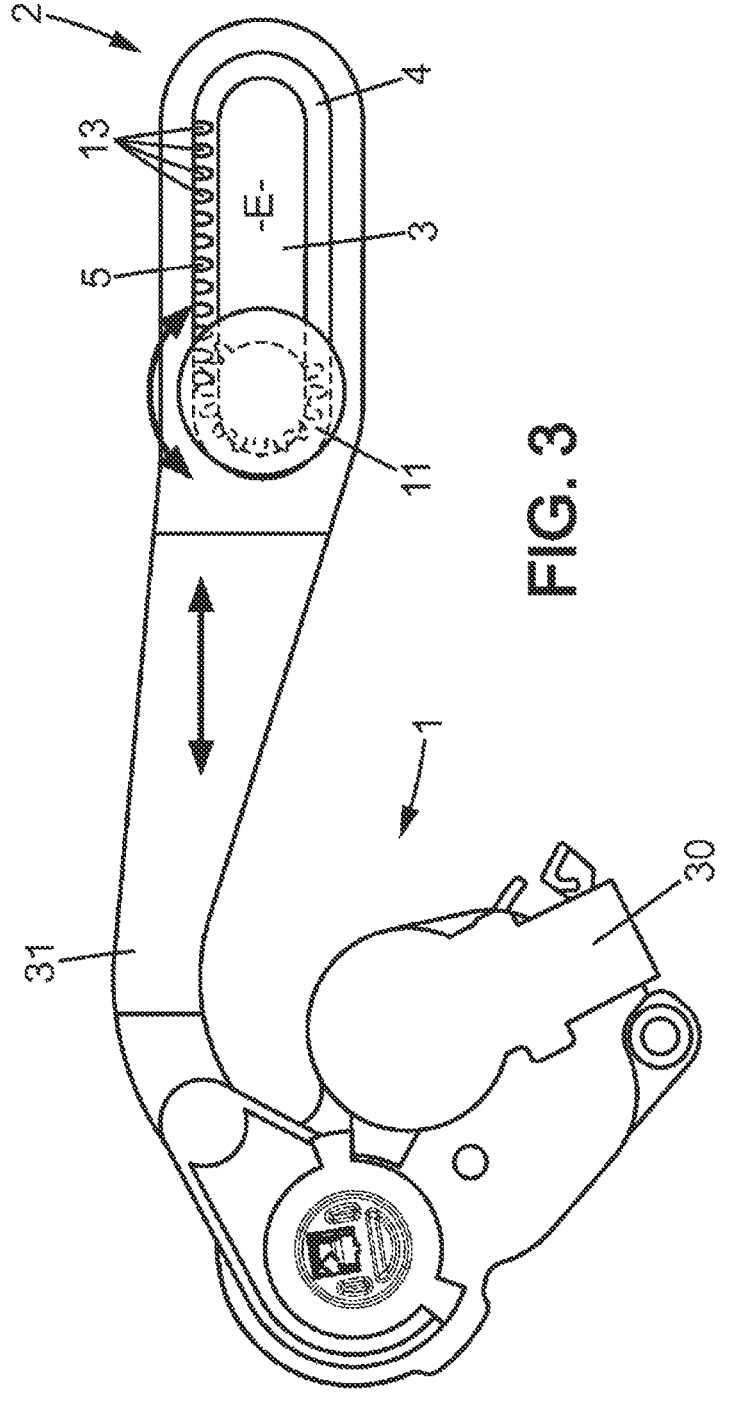
FIG. 3 shows the control device of FIG. 1 in a first end position.
Figure 4:
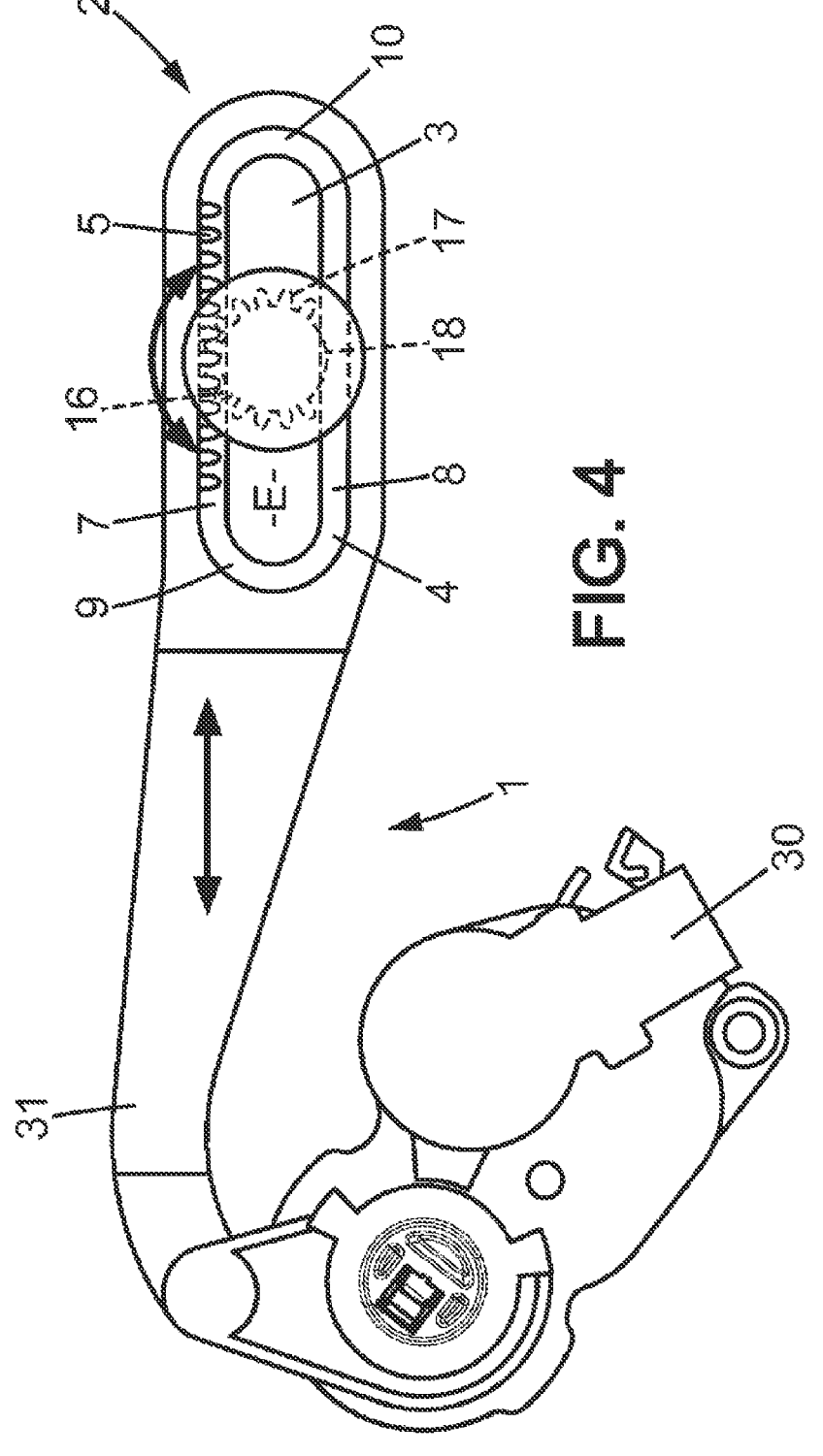
FIG. 4 shows the control device of FIG. 1 in a second end position.
Figure 5:
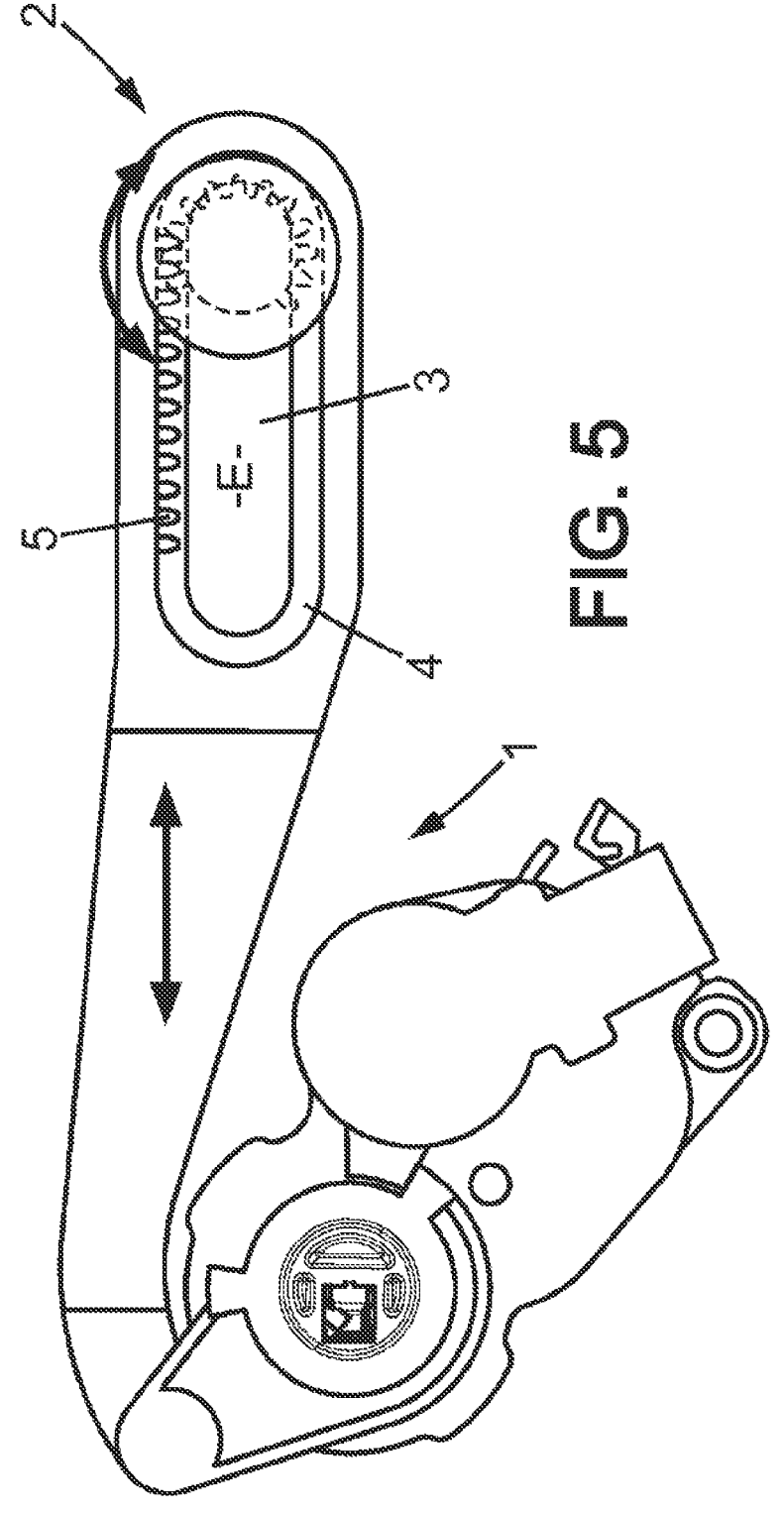
FIG. 5 shows the control device of FIG. 1 in an intermediate position.

As is shown in FIGS. 3 to 5, during operation, the actuator 30 moves the arm 31 in translation between two end positions. The rack 5 of the arm 31 then engages the toothed wheel 11, causing the toothed wheel 11 to rotate between the two rounded ends 9,10 of the oblong hole 3, thereby directly or indirectly pivoting the flap.

Therefor This simplifies the process for manufacturing the heating, ventilating and/or air conditioning system fitted with the control device 1 and reduces its cost.

The invention claimed is:

1. A device for controlling an element for a motor vehicle heating, ventilating and/or air conditioning system, comprising:

an arm comprising an orifice, the orifice comprising an inside circumference that includes a first section-height part and a second section-height part that is shorter than the first section-height part in an axial direction, wherein the first section-height part includes a rack;

a toothed wheel integrally formed with a shaft of a flap, where the toothed wheel is configured so as to cooperate with the first section-height part, the second section-height part, and the rack to move the flap, wherein the first section-height part includes a top and the toothed wheel includes an upper portion, wherein the upper portion of the toothed wheel rests on the top of the first section-height part, such that the first section-height part axially retains the toothed wheel, wherein the second section-height part radially guides the toothed wheel, wherein the orifice comprises an oblong hole, and the arm is configured to translate between two end positions such that the toothed wheel moves along an entire length of the oblong hole.

2. The device according to claim 1, wherein a portion of the top of the first section-height part and the rack are disposed at opposite sides of said inside circumference.

3. The device according to claim 1, wherein the first section-height part is constituted by a first diameter of the oblong hole and the second section-height part is constituted by a second diameter of the oblong hole, which is different from the first diameter.

4. The device according to claim 3, wherein a first diameter of the toothed wheel is larger than the first diameter of the oblong hole.

5. The device according to claim 4, wherein a second diameter of the toothed wheel is larger than the second diameter of the oblong hole.

6. The device according to claim 5, wherein the second section-height part is further constituted by a third diameter of the toothed wheel, which is approximately identical to the second diameter of the oblong hole.

7. The device according to claim 1, wherein the first section-height part and the second section-height part are constituted by a diameter of the oblong hole.

8. The device according to claim 7, wherein a diameter of the toothed wheel is larger than said diameter of the oblong hole.

* * * * *